M. TSCHIRGI.
Pressure Regulator for Fermenting Beer.
No. 213,148. Patented Mar. 11, 1879.
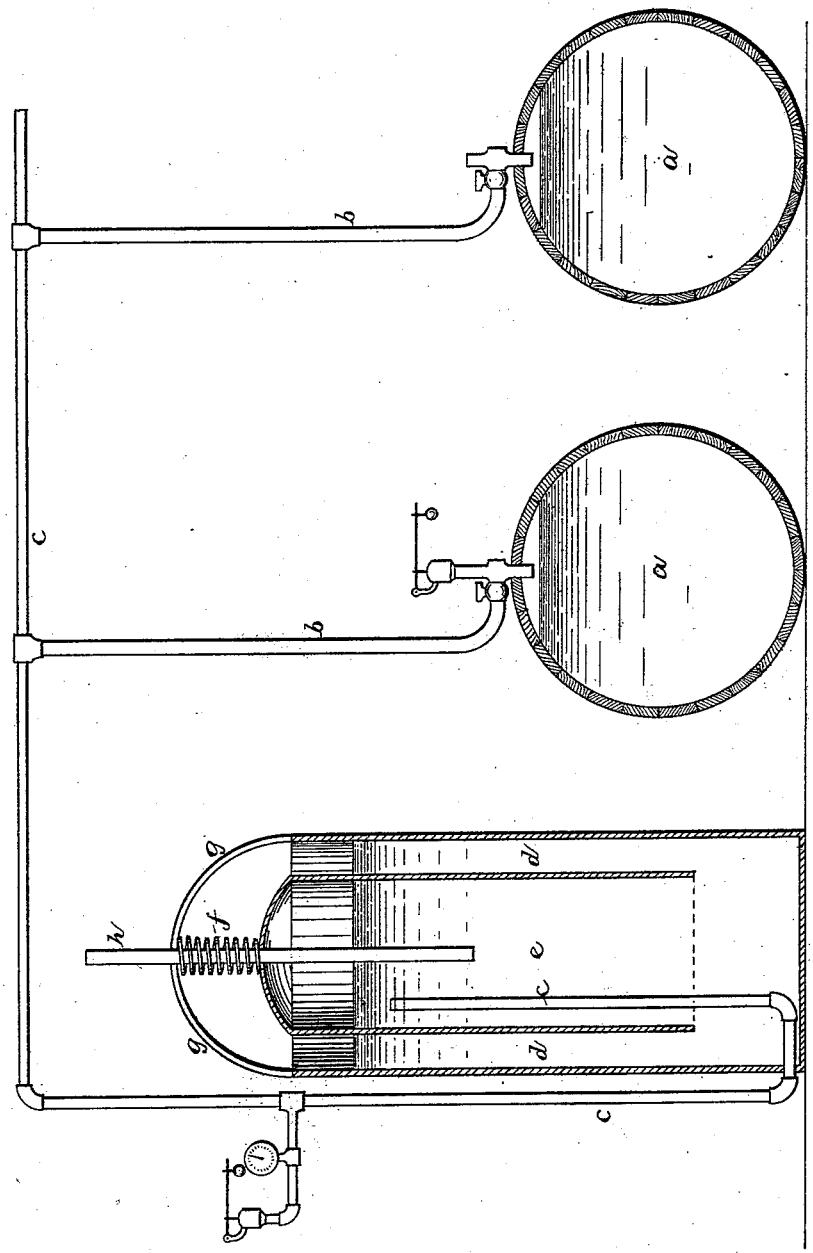

UNITED STATES PATENT OFFICE.

MATHEUS TSCHIRGI, OF DUBUQUE, IOWA.

IMPROVEMENT IN PRESSURE-REGULATORS FOR FERMENTING BEER.

Specification forming part of Letters Patent No. 213,148, dated March 11, 1879; application filed January 6, 1879.

*To all whom it may concern:*

Be it known that I, M. TSCHIRGI, of Dubuque, in the county of Dubuque and State of Iowa, have invented certain new and useful Improvements in Pressure-Regulators for Fermenting Beer; and I do hereby declare the following to be a full, clear, and exact description of the invention, such as will enable others skilled in the art to which it pertains to make and use it, reference being had to the accompanying drawings, which form part of this specification.

My invention relates to an improvement in pressure-regulators for fermenting beer; and it consists in the combination of an outer cylinder, which is partially filled with water, a smaller inverted cylinder, which is partially submerged in the water, and into which the gas from the casks is discharged, a pipe that is passed down through the top of the smaller cylinder into the water, and a spring to depress the smaller cylinder after it has been raised by the pressure of the gas, all of which will be more fully described hereinafter.

The accompanying drawing represents a vertical section of my invention.

$a$ $a$ represent the fermenting-casks, which are connected by suitable pipes $b$ with the pipe $c$, which passes down at one end through the outer reservoir, $d$, containing water, up into the inner reservoir, $e$. There may be any number of these casks, and each one may be provided with a safety-valve of its own; or the pipe $c$ will be provided with a gage and safety-valve at any suitable point.

The outer reservoir is open at its top, and filled to any suitable height with water, and the inner reservoir, $e$, closed at its top and open at its bottom, is submerged in this reservoir to any suitable depth, and held pressed down by a suitable spring, $f$, on its top.

Passing down through the bail or other device, $g$, on the top of the reservoir $d$ is a pipe, $h$, which has its lower end passed down through the top of the inner reservoir to any suitable depth in the water.

When the pressure of gas has reached its maximum, the inner cylinder compresses the spring $f$ as it rises upward, and at the same time the water is forced downward out into the outer cylinder until the lower end of the pipe $h$ is exposed, when the surplus gas escapes into the air, and then the spring at once forces the cylinder downward again. In this manner a uniform pressure is kept in the casks $a$.

I am aware that two cylinders have been used in a pressure-regulator, the smaller one of which is placed on a rod and held down from above and pressed up from below by springs, but in which there is no provision made for the escape of the gas when the pressure reaches a certain point.

I am also aware that a number of casks have been united together and held under a regulated pressure during fermentation, and this I disclaim.

My invention consists in so arranging the pipe $h$ as to allow the gas to escape into the air when the pressure becomes too great.

Having thus described my invention, I claim—

The combination of the outer cylinder, containing water, the inner cylinder, having its lower edge submerged in the water, the pipe $c$, spring $f$, and pipe $h$, having its end extend down below the level of the water, and through which the gas escapes when the pressure becomes too great, substantially as shown.

In testimony that I claim the foregoing I have hereunto set my hand this 23d day of December, 1878.

MATHEUS TSCHIRGI.

Witnesses:
D. RHOMBERG,
F. T. WALKER,
J. A. RHOMBERG.